US010823249B2

(12) United States Patent
Sawai et al.

(10) Patent No.: US 10,823,249 B2
(45) Date of Patent: Nov. 3, 2020

(54) SHOCK ABSORBER, VEHICLE, AND SNOWMOBILE

(71) Applicant: Yamaha Hatsudoki Kabushiki Kaisha, Shizuoka-ken (JP)

(72) Inventors: Seiji Sawai, Shizuoka (JP); Takashi Imamura, Shizuoka (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 26 days.

(21) Appl. No.: 15/715,161

(22) Filed: Sep. 26, 2017

(65) Prior Publication Data

US 2018/0094689 A1 Apr. 5, 2018

(30) Foreign Application Priority Data

Sep. 30, 2016 (JP) ................................ 2016-194461

(51) Int. Cl.
*F16F 9/32* (2006.01)
*B60G 15/06* (2006.01)
(Continued)

(52) U.S. Cl.
CPC .......... *F16F 9/3221* (2013.01); *B60G 13/003* (2013.01); *B60G 17/08* (2013.01);
(Continued)

(58) Field of Classification Search
CPC . F16F 9/3221; F16F 9/065; F16F 9/32; B60G 17/08; B60G 15/06
(Continued)

(56) References Cited

U.S. PATENT DOCUMENTS 1,567,517 A * 12/1925 Kisbey ................ B60G 13/08
188/321.11
3,480,096 A 11/1969 Hammitt
(Continued)

FOREIGN PATENT DOCUMENTS

EP 1944523 A1 7/2008
EP 2165863 A1 3/2010
(Continued)

OTHER PUBLICATIONS

Search Report dated Feb. 23, 2018, for corresponding EP Patent Application No. 17187630.3.
(Continued)

*Primary Examiner* — Christopher P Schwartz
(74) *Attorney, Agent, or Firm* — HEA Law PLLC (57) ABSTRACT

A shock absorber includes a cylinder and a piston. The piston is configured to partition an internal space of the cylinder into two oil chambers and is capable of sliding in an axial direction of the cylinder. The piston having formed therethrough a communication path configured to bring the two oil chambers into communication with each other. The shock absorber also includes a first rod and a second rod. The first rod extends in a first direction of the axial direction with respect to the piston. The second rod has a diameter larger than a diameter of the first rod, and extends in a second direction of the axial direction, which is opposite to the first direction, with respect to the piston. The shock absorber further includes a rod mounting member, which is provided on the first rod, and a cylinder mounting member, which is provided on the cylinder and arranged as offset from an axis of the cylinder.

18 Claims, 10 Drawing Sheets

(51) Int. Cl.
  *F16F 9/54* (2006.01)
  *B60G 13/00* (2006.01)
  *F16F 9/20* (2006.01)
  *B60G 17/08* (2006.01)
  *F16F 9/06* (2006.01)
  *F16F 9/36* (2006.01)
  *F16F 9/096* (2006.01)

(52) U.S. Cl.
  CPC ............... *F16F 9/065* (2013.01); *F16F 9/20* (2013.01); *F16F 9/362* (2013.01); *F16F 9/54* (2013.01); *B60G 2200/144* (2013.01); *B60G 2200/156* (2013.01); *B60G 2202/312* (2013.01); *B60G 2204/128* (2013.01); *B60G 2300/124* (2013.01); *B60G 2300/322* (2013.01); *F16F 9/096* (2013.01); *F16F 2230/0005* (2013.01)

(58) Field of Classification Search
  USPC .................. 280/124.146, 124.147, 124.155; 267/64.19, 64.23, 64.28, 122, 221–226; 188/314, 318, 322.21
  See application file for complete search history.

(56) References Cited

U.S. PATENT DOCUMENTS

| | | | |
|---|---|---|---|
| 3,573,880 A * | 4/1971 | Sakai | B60G 15/07 267/221 |
| 4,010,829 A | 3/1977 | Naito et al. | |
| 4,344,637 A * | 8/1982 | Williams, Jr. | B62M 27/00 188/269 |
| 4,685,690 A | 8/1987 | Fujita et al. | |
| 4,746,106 A * | 5/1988 | Fukumura | F16F 9/468 267/218 |
| 4,749,152 A * | 6/1988 | Veaux | B64C 25/60 188/321.11 |
| 6,082,720 A * | 7/2000 | Ducloux | B60G 15/063 267/221 |
| 6,086,060 A * | 7/2000 | Berthold | B60G 11/30 267/64.15 |
| 6,286,642 B1 * | 9/2001 | Yi | B62K 25/04 188/269 |
| 6,659,241 B2 * | 12/2003 | Sendrea | F16F 9/44 188/314 |
| 6,923,461 B2 * | 8/2005 | Momose | B60G 15/063 280/124.155 |
| 7,581,609 B2 | 9/2009 | Kubota | |
| 2010/0140007 A1 * | 6/2010 | Ogura | B62M 27/02 180/182 |

FOREIGN PATENT DOCUMENTS

| | | |
|---|---|---|
| JP | S6095311 U | 6/1985 |
| JP | S61229608 A | 10/1986 |
| JP | 2006213166 A | 8/2006 |
| JP | 2010-096347 A | 4/2010 |
| JP | 2012207762 A | 10/2012 |
| JP | 2016141386 A | 8/2016 |

OTHER PUBLICATIONS

Office Action dated Aug. 18, 2020, for corresponding JP Patent Application No. 2016-194461 with English translation.

* cited by examiner

SHOCK ABSORBER, VEHICLE, AND SNOWMOBILE

CROSS-REFERENCE TO RELATED APPLICATION

The present application claims priority from Japanese application JP2016-194461 filed on Sep. 30, 2016, the content of which is hereby incorporated by reference into this application.

BACKGROUND OF THE INVENTION

Description of the Related Art

In general, in a shock absorber for a vehicle, one rod coupled to a piston provided inside a cylinder extends externally from one end portion of the cylinder. Oil filling the cylinder is pressurized by a high-pressure gas, a spring, or the like. With this structure, a force is exerted on the rod in a direction in which the rod projects from the cylinder by a pressure received by the piston from the oil. Specifically, the force generated by a hydraulic pressure is exerted on the shock absorber in an extension direction.

The shock absorber as described above, in which the force generated by the hydraulic pressure is exerted in the extension direction, may not sufficiently absorb a shock received from a ground surface, resulting in a fear of adversely affecting riding comfort of a vehicle. Further, timing of a load shift to an outer wheel or ski is likely to be advanced at cornering, also resulting in the fear of adversely affecting the riding comfort of the vehicle.

To cope with the adverse effect described above, the following is disclosed in Japanese Patent Application Laid-open No. 2010-96347. Specifically, in the shock absorber including a main piston rod provided on one side of the piston and a sub-piston rod provided on another side of the piston, a diameter of the sub-piston rod is set larger than a diameter of the main piston rod to be coupled externally. With this structure, a force is exerted on the main piston rod in a direction in which the main piston rod is accommodated into the cylinder. Specifically, the force generated by the hydraulic pressure is exerted on the shock absorber in a contraction direction.

The shock absorber in which the force generated by the hydraulic pressure is exerted in the contraction direction as described above can solve the problem of the above-mentioned shock absorber in which the force generated by the hydraulic pressure is exerted in the extension direction to improve the riding comfort of the vehicle.

SUMMARY OF THE INVENTION

In the shock absorber, in which the force generated by the hydraulic pressure is exerted in the contraction direction, a movable range is required for the two rods. Therefore, the shock absorber cannot be prevented from being increased in length and size, and has a problem in ease of layout. In the shock absorber disclosed in Japanese Patent Application Laid-open No. 2010-96347, a cylinder tube is formed about twice as long as an interval between a first rod guide and a second rod guide so as to accommodate the sub-piston rod extending from the second rod guide.

In particular, the shock absorber to be applied to a vehicle for running on an irregular ground, such as a recreational off-highway vehicle (ROV) or a snowmobile, is required to ensure an ability to absorb the shock. Thus, it is difficult to reduce a rod length and a cylinder size.

The present application has been made to solve the problems described above, and has an object to provide a shock absorber, a vehicle, and a snowmobile, which are capable of improving ease of layout of the shock absorber in which a force generated by a hydraulic pressure is exerted in a contraction direction.

According to one embodiment of the present application, a shock absorber includes a cylinder and a piston. The piston is configured to partition an internal space of the cylinder into two oil chambers and is capable of sliding in an axial direction of the cylinder. The piston having formed therethrough a communication path configured to bring the two oil chambers into communication with each other. The shock absorber includes a first rod, a first rod guide, a second rod, and a second rod guide. The first rod extends in a first direction of the axial direction with respect to the piston. The first rod passes through the first rod guide and the first rod guide is provided on the cylinder. The second rod has a diameter larger than a diameter of the first rod. The second rod extends in a second direction of the axial direction, which is opposite to the first direction, with respect to the piston. The second rod passes through the second rod guide and the second rod guide is provided on the cylinder. The shock absorber further includes a pressurizing mechanism, a rod mounting member, a cylinder mounting member, and a spring. The pressurizing mechanism is configured to pressurize oil filling the internal space of the cylinder. The rod mounting member is provided on the first rod outside of the cylinder. The cylinder mounting member is provided on the cylinder outside of the cylinder. The spring expands and contracts in accordance with relative movement between the rod mounting member and the cylinder mounting member. The cylinder mounting member is offset from an axis of the cylinder.

Further, according to another embodiment of the present application, a vehicle includes the shock absorber.

According to the shock absorber described above, the cylinder mounting member is offset from the axis of the cylinder. Hence, a distance between the rod mounting member and the cylinder mounting member can be reduced while ensuring the movable range of the second rod. In this manner, the ease of layout of the shock absorber can be improved.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing embodiments.

Figure 1:
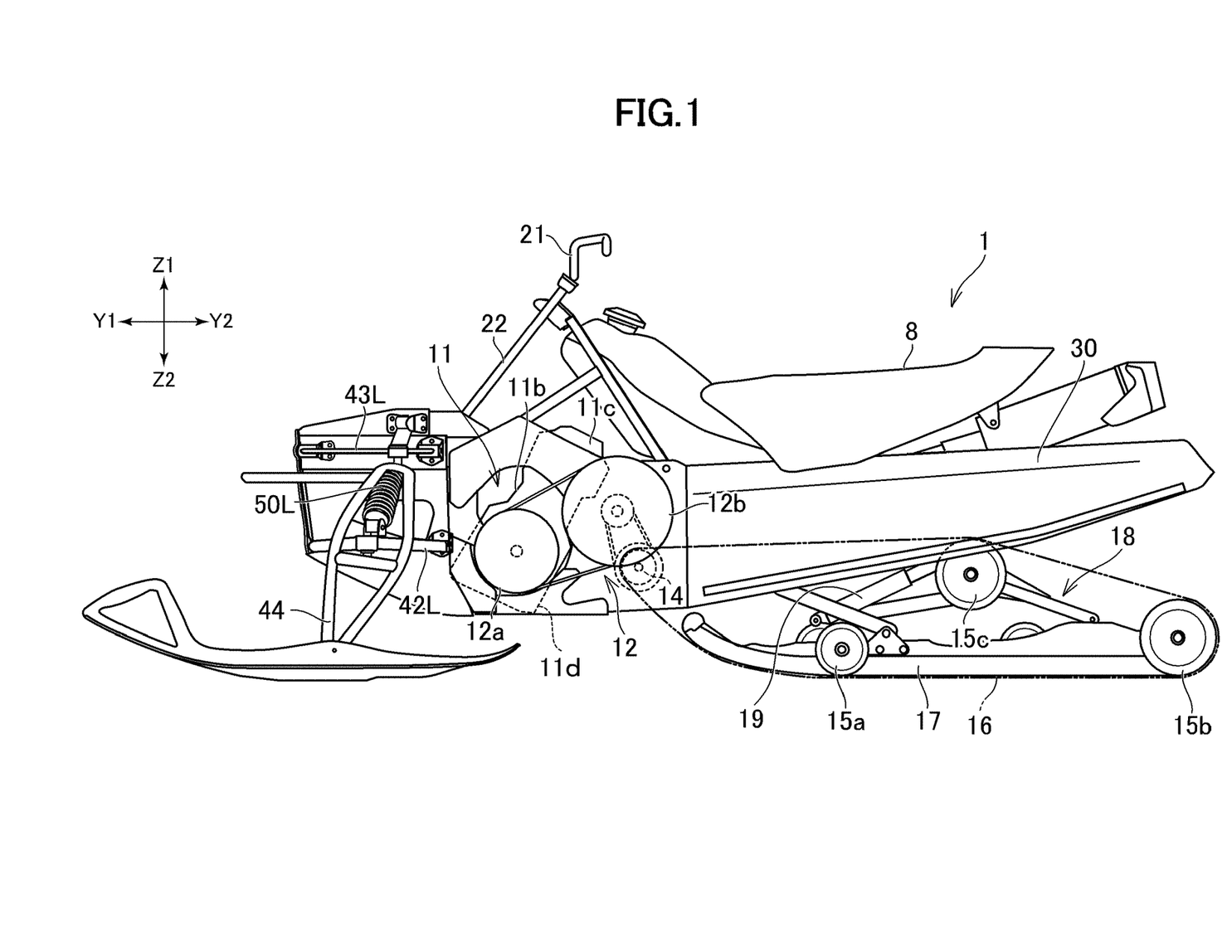
FIG. 1 is a side view of a snowmobile according to an embodiment of the present application.
Figure 2:
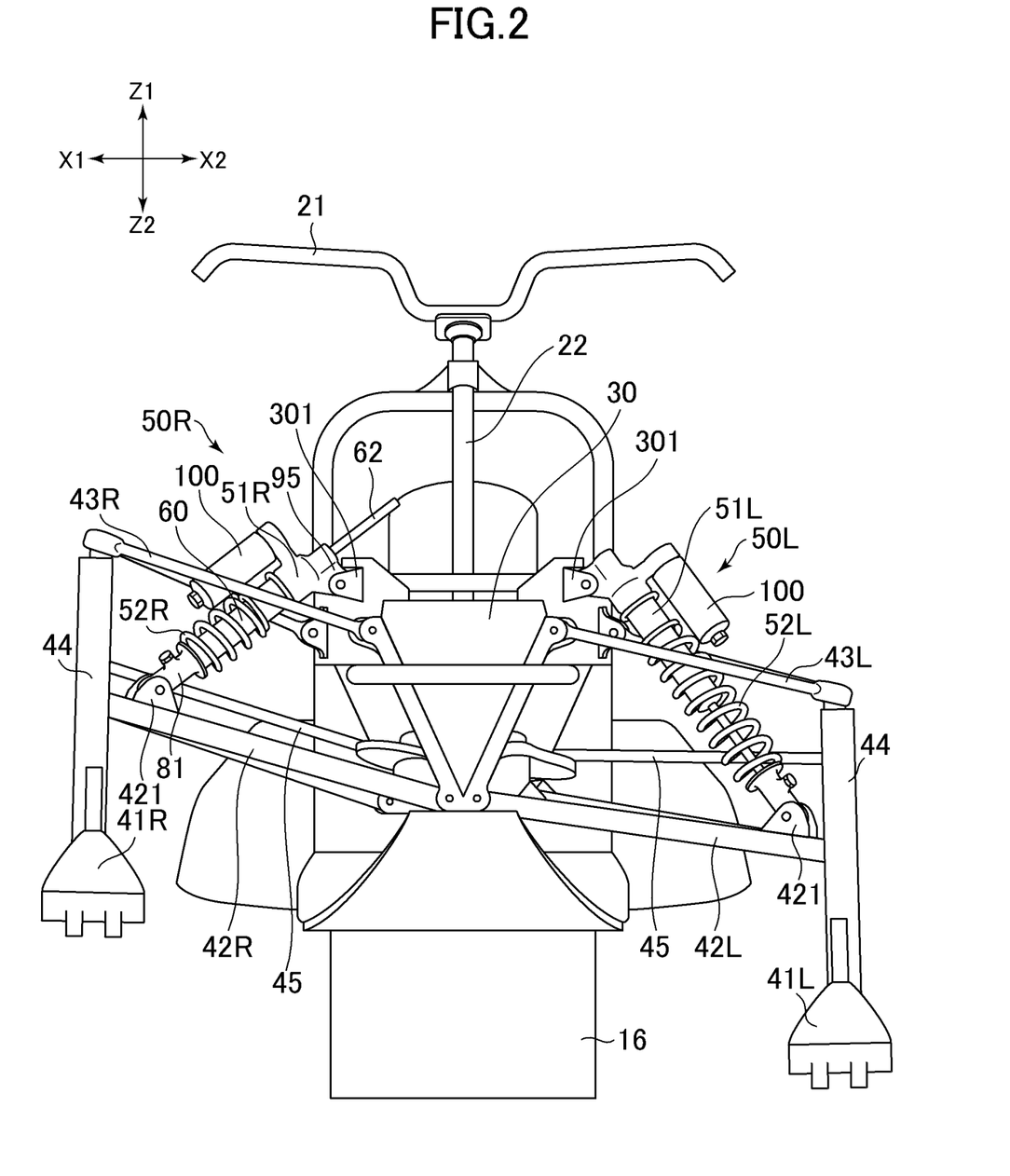
FIG. 2 is a front view of the snowmobile illustrated in FIG. 1.

FIG. 1 is a side view of a snowmobile 1 according to an embodiment of the present application, and FIG. 2 is a front view of the snowmobile 1. In FIG. 2, illustration of a front cover 9 (see FIG. 1) configured to cover a front part of the snowmobile 1 is omitted. In the following description, a direction indicated by the arrow Y1 is referred to as "forward direction". A direction indicated by the arrow Y2 is referred to as "rearward direction". A side indicated by the arrow Y1 is referred to as "front side" and a side indicated by the arrow Y2 is referred to as "rear side" in FIG. 1 and FIG. 2. Similarly, a direction indicated by the arrow Z1 is referred to as "upward direction". A direction indicated by the arrow Z2 is referred to as "downward direction". A side indicated by the arrow Z1 is referred to as "upper side" and a side indicated by the arrow Z2 is referred to as "lower side". A direction indicated by the arrow X1 is referred to as "right-hand direction". A direction indicated by the arrow X2 is referred to as "left-hand direction". A side indicated by the arrow X1 is referred to as "right side" and a side indicated by the arrow X2 is referred to as "left side".

As illustrated in FIG. 2, the snowmobile 1 includes a right ski 41R arranged on the right of a vehicle body frame 30 and a left ski 41L arranged on the left of the vehicle body frame 30 as grounded portions. The right ski 41R is supported by a lower arm 42R and an upper arm 43R. Similarly, the left ski 41L is supported by a lower arm 42L and an upper arm 43L. The right lower arm 42R and the right upper arm 43R extend in the right-hand direction from base portions thereof coupled to the vehicle body frame 30 and are coupled to a knuckle 44 having a lower end coupled to the right ski 41R. The left lower arm 42L and the left upper arm 43L extend in the left-hand direction from base portions thereof coupled to the vehicle body frame 30 and are coupled to another knuckle 44 having a lower end coupled to the left ski 41L. The base portions of the arms 42R, 43R, 42L, and 43L are coupled to the vehicle body frame 30 so as to be rotatable. As a result, the skis 41R and 41L are vertically movable relative to the vehicle body frame 30.

The snowmobile 1 includes shock absorbers 50R and 50L (hereinafter also collectively referred to as "shock absorbers 50") according to the embodiment. The right shock absorber 50R includes a right damper 51R and a right spring 52R. The left shock absorber 50L includes a left damper 51L and a left spring 52L. One end of each of the dampers 51R and 51L (hereinafter also collectively referred to as "dampers 51") is coupled to a corresponding one of brackets 301 provided on the vehicle body frame 30, whereas another end of each of the dampers 51R and 51L is coupled to a corresponding one of brackets 421 provided on the lower arms 42R and 42L, respectively. The springs 52R and 52L (hereinafter also collectively referred to as "springs 52") are, for example, coil springs, and exhibit spring forces in accordance with extension and contraction of the dampers 51R and 51L. A detailed configuration of each of the shock absorbers 50R and 50L is described later.

As illustrated in FIG. 1, the snowmobile 1 includes an engine 11 and a transmission 12 as a drive system. The engine 11 includes a crank case 11d configured to accommodate a crankshaft (not shown) therein, a cylinder block 11b mounted to the crank case 11d, and a cylinder head 11c mounted to the cylinder block 11b. A cylinder is formed inside the cylinder block 11b. An intake passage and an exhaust passage being in communication with a combustion chamber of the cylinder are formed inside the cylinder head 11c. The crank case 11d is positioned on the rear side of the arms 42R and 43R configured to support the ski 41R and the arms 42L and 43L configured to support the ski 41L on a side view of a vehicle body. The cylinder block 11b and the cylinder head 11c are arranged so that an axis of the cylinder is inclined rearward with respect to the engine 11. A posture of the engine 11 is not limited to an illustrated example.

The transmission 12 is, for example, a continuously variable transmission, and includes a drive pulley 12a configured to receive a torque from the crankshaft and a driven pulley 12b configured to receive the torque from the drive pulley 12a. A belt configured to transfer the torque of the drive pulley 12a to the driven pulley 12b is looped around the drive pulley 12a and the driven pulley 12b. The drive pulley 12a is provided on, for example, an end portion of the crankshaft. The driven pulley 12b is provided on, for example, a secondary shaft (not shown) which is positioned on the rear side of the crankshaft and at a higher position than a position of the crankshaft. The transmission 12 is not necessarily required to be the continuously variable transmission, and may be, for example, a gear type transmission including a gear having a plurality of gear positions.

The snowmobile 1 includes a track belt drive shaft 14 provided with a sprocket configured to mesh with a track belt 16. The track belt drive shaft 14 is coupled to the secondary shaft via a belt, a chain, or the like to receive the torque of the engine 11 through the transmission 12. Guide wheels 15a, 15b, and 15c, a slide rail 17, a link structure 18, and a shock absorber 19 are arranged inside the track belt 16. The guide wheels 15a, 15b, and 15c, and the slide rail 17 are configured to guide the track belt 16. The link structure 18 and the shock absorber 19 are provided between the guide wheel 15c supported on the vehicle body frame 30 and the slide rail 17. The slide rail 17 configured to guide the track belt 16 is vertically movable relative to the vehicle body frame 30 through the link structure 18. The shock absorber 19 is arranged between the vehicle body frame 30 and the track belt 16.

The snowmobile 1 has a seat 8 for a driver to sit in. The seat 8 is arranged above the track belt 16. In front of the seat 8, a steering handle 21 configured to steer the skis 41R and 41L is arranged. The steering handle 21 is mounted to a top of a steering column 22. The steering column 22 extends downward and obliquely to the front side from a central portion of the steering handle 21. The steering handle 21 is coupled to the skis 41R and 41L through intermediation of the steering column 22 and tie rods 45 (see FIG. 2).

Figure 3:
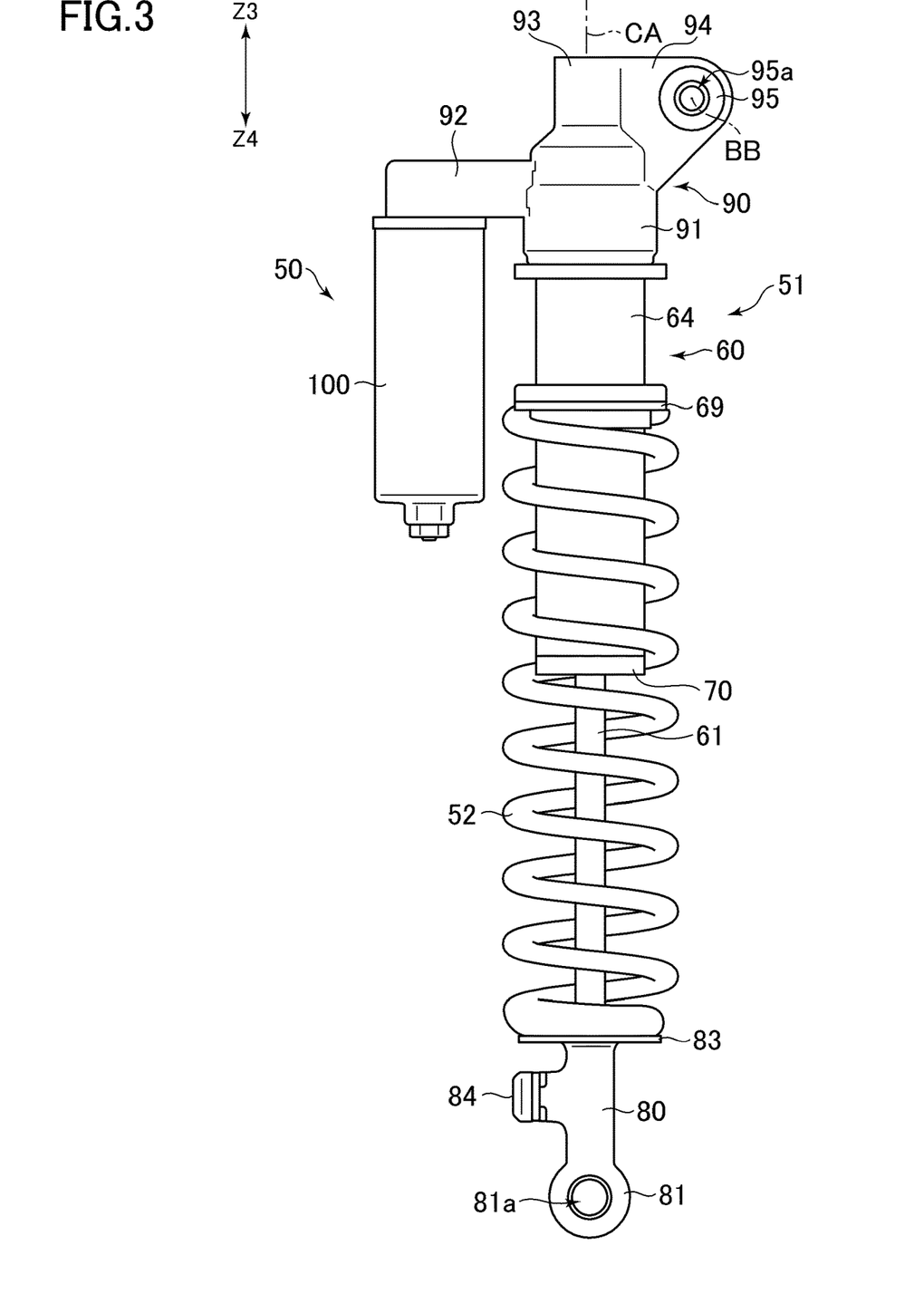
FIG. 3 is a front view of a shock absorber according to the embodiment.
Figure 4:
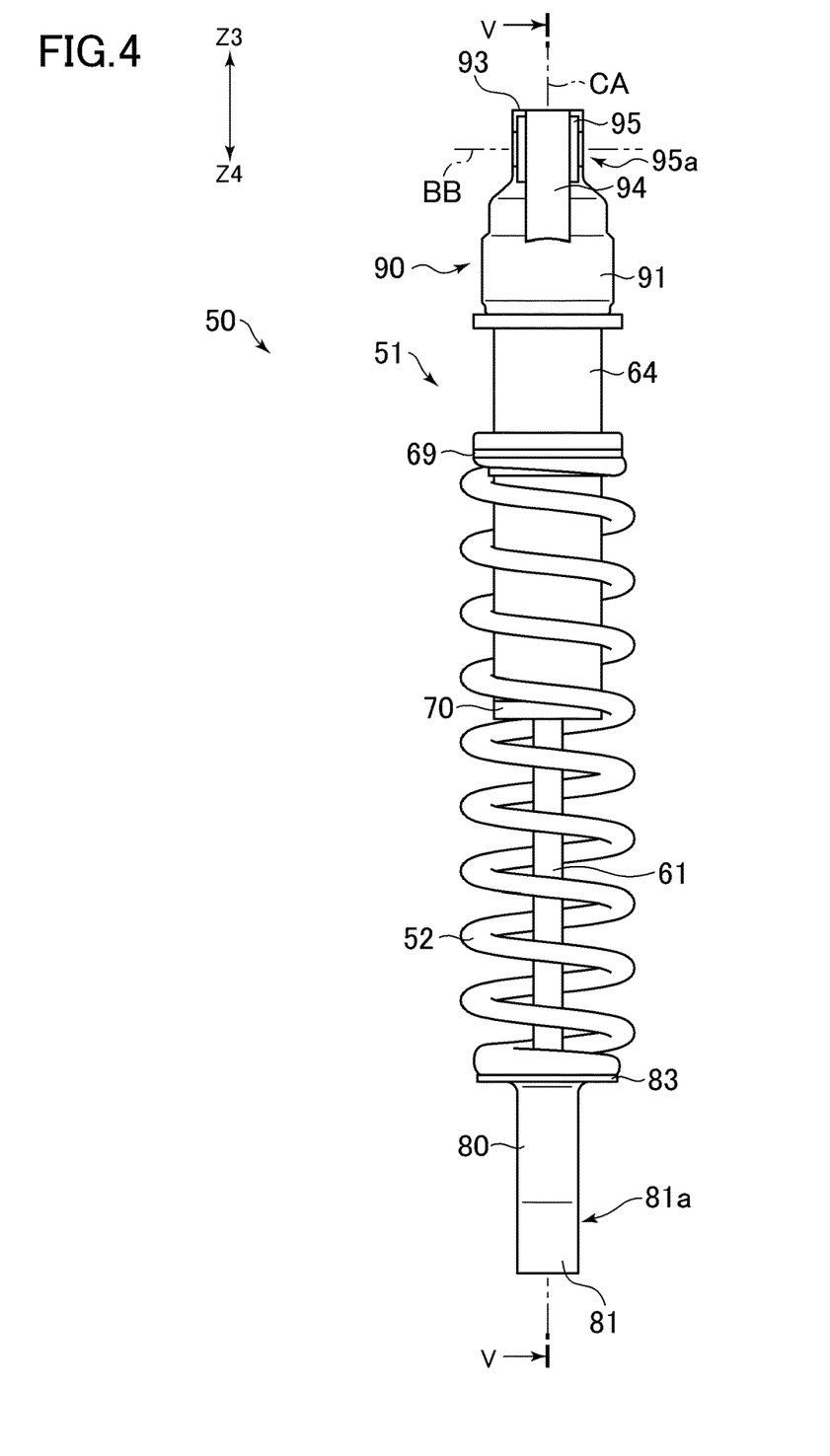
FIG. 4 is a side view of the shock absorber illustrated in FIG. 3.
Figure 5:
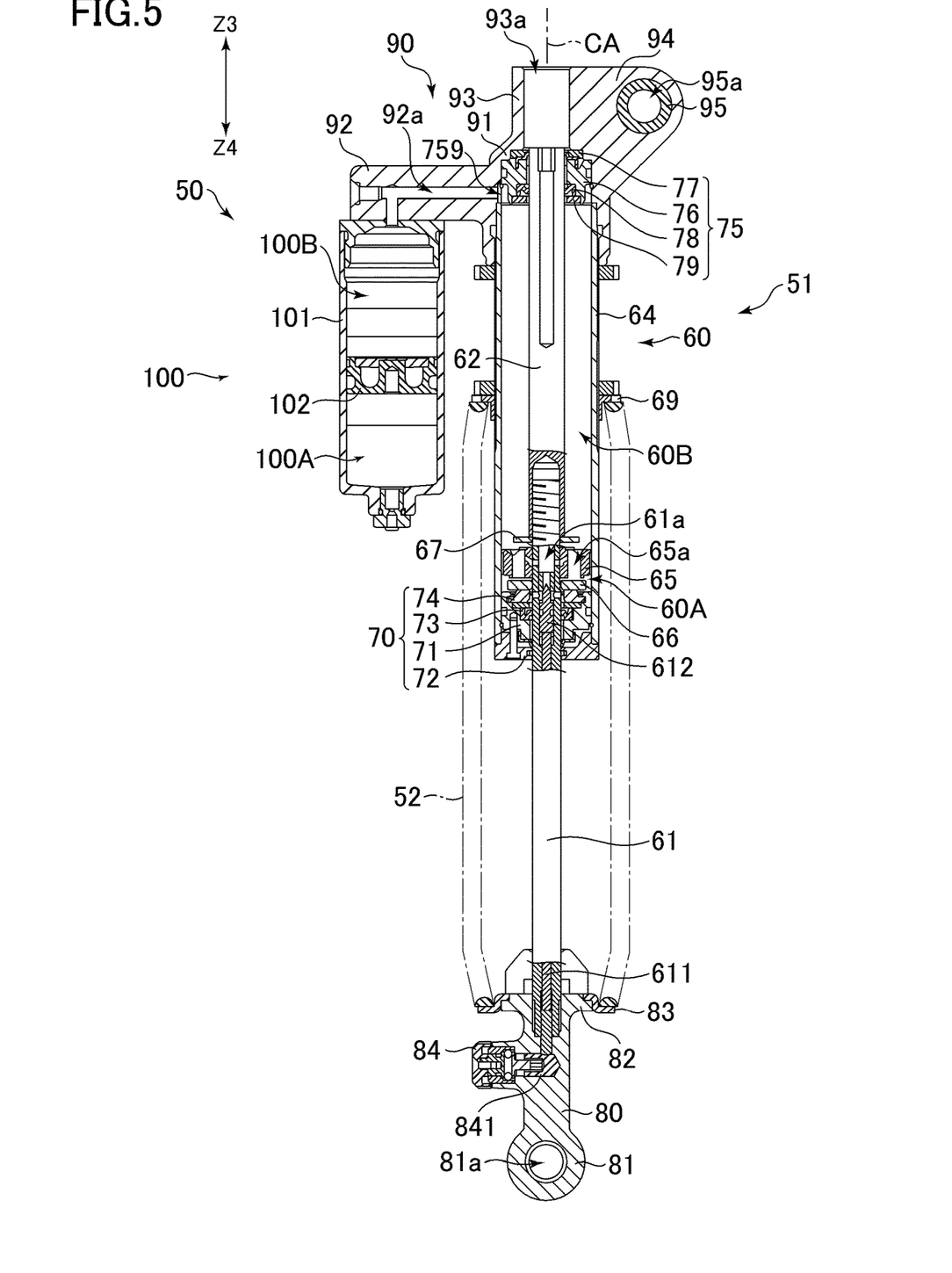
FIG. 5 is a sectional view of the shock absorber illustrated in FIG. 3.
Figure 6:
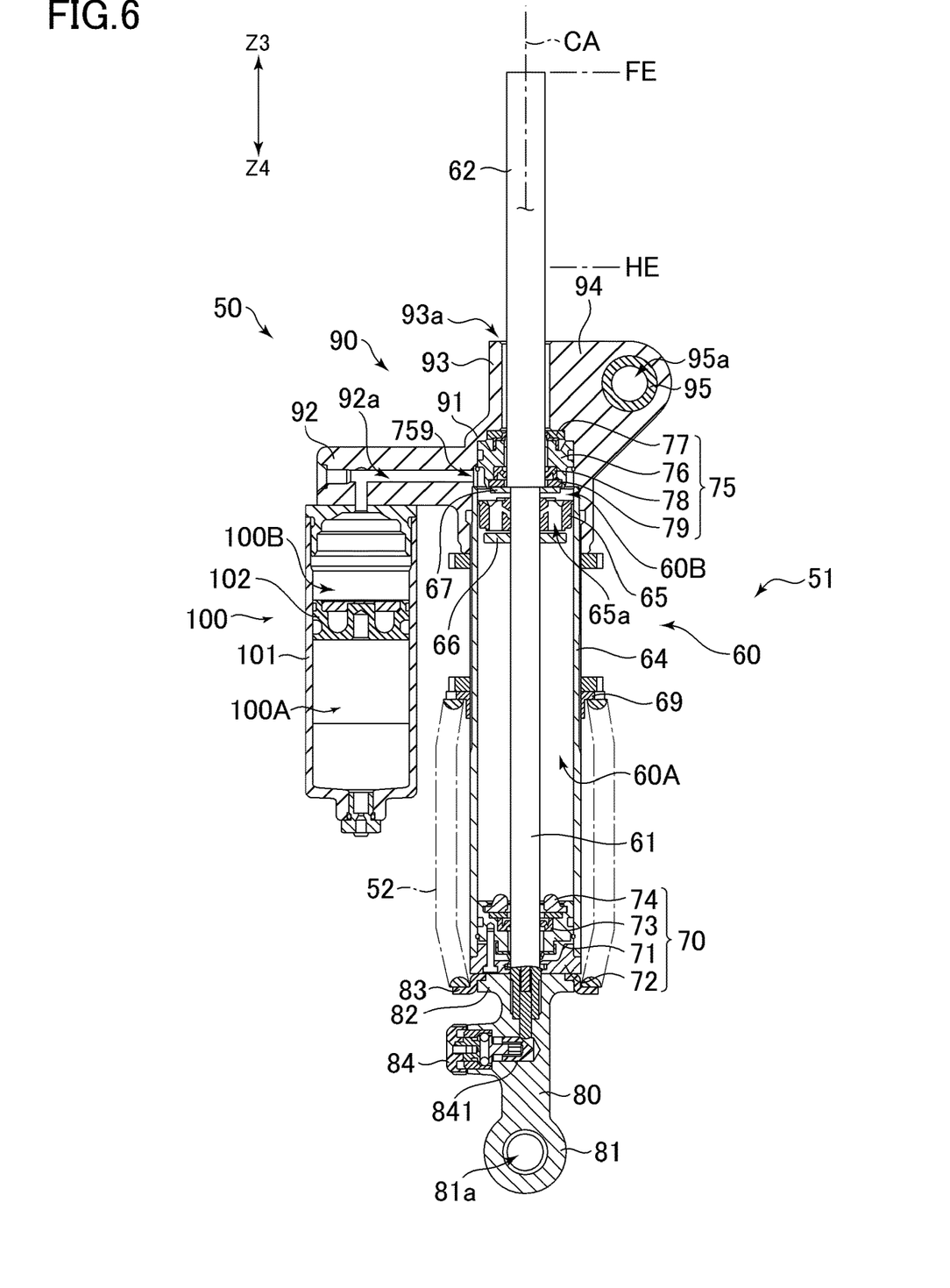
FIG. 6 is another sectional view of the shock absorber illustrated in FIG. 3.

The shock absorber 50 according to the embodiment is now described. The shock absorber 50 is a shock absorber in which a force generated by a hydraulic pressure is exerted in a contraction direction, as described later. FIG. 3 is a front view of the shock absorber 50, and FIG. 4 is a side view of the shock absorber 50. FIG. 5 and FIG. 6 are sectional views of the shock absorber 50 when the shock absorber 50 is cut along the line V-V of FIG. 4 through an axis CA of the cylinder 60. FIG. 5 is the sectional view for illustrating a state in which the shock absorber 50 is most extended, whereas FIG. 6 is the sectional view for illustrating a state in which the shock absorber 50 is most contracted.

In the following description, a direction indicated by the arrow Z3 and a direction indicated by the arrow Z4 which are parallel to the axis CA of the cylinder 60 are referred to as "upward direction" and "downward direction", respectively. A side indicated by the arrow Z3 and a side indicated by the arrow Z4 are referred to as "upper side" and "lower side", respectively. The upward direction, the downward direction, the upper side, and the lower side for the shock absorber 50 correspond to the upward direction, the downward direction, the upper side, and the lower side for the snowmobile 1, respectively.

The damper 51 of the shock absorber 50 includes a cylinder 60 having a cylindrical shape, a piston 65, a first rod (main rod) 61, and a second rod (sub-rod) 62. The cylinder 60 is filled with oil. The piston 65 is slidable in a vertical direction inside the cylinder 60. The first rod 61 extends downward with respect to the piston 65. The second rod 62 extends upward with respect to the piston 65. A rod mounting member 81 mounted to one of two targets of damping is provided on a lower end portion of the first rod 61, whereas a cylinder mounting member 95 mounted to another of the two targets is provided on an upper end portion of the cylinder 60. The spring 52 is expanded and contracted in accordance with relative movement between the rod mounting member 81 and the cylinder mounting member 95.

The cylinder 60 includes a cylinder tube 64 having a cylindrical shape, a first rod guide 70, and a second rod guide 75. The first rod guide 70 is provided on a lower end portion of the cylinder tube 64 and is configured to allow the first rod 61 to pass therethrough. The second rod guide 75 is provided on an upper end portion of the cylinder tube 64 and is configured to allow the second rod 62 to pass therethrough. The first rod guide 70 is fitted into the lower end portion of the cylinder tube 64. The first rod guide 70 includes a guide main body 71 having an approximately hollow cylindrical shape, a lid body 72, an oil seal 73, and a rubber member 74. The lid body 72 is positioned below the guide main body 71. The oil seal 73 is provided between the first rod 61 and the guide main body 71. The rubber member 74 is mounted to a top of the guide main body 71. The lid body 72 is configured to close a lower end opening of the cylinder tube 64 and is fixed to the guide main body 71 with a screw. The rubber member 74 comes into abutment against a stopper 66 described later when the shock absorber 50 is most extended (see FIG. 5).

The second rod guide 75 is fitted into a cap member 90 mounted to the upper end portion of the cylinder tube 64 and is arranged to close an upper end opening of the cylinder tube 64. The second rod guide 75 includes a guide main body 76 having an approximately hollow cylindrical shape, a plate member 77 having an annular shape, an oil seal 78, and a plate member 79 having an annular shape. The plate member 77 is positioned above the guide main body 76. The oil seal 78 is provided between the second rod 62 and the guide main body 76. The plate member 79 is mounted to a lower portion of the guide main body 76. The plate member 79 comes into abutment against a stopper 67 described later when the shock absorber 50 is most contracted (see FIG. 6). An outer diameter of the lower portion of the guide main body 76 is smaller than a diameter of the upper end opening of the cylinder tube 64. A gap 759 is formed between the upper end of the cylinder tube 64 and the second rod guide 75. A space inside the cylinder 60 is brought into communication with a pressurizing mechanism 100 described later through the gap 759.

The piston 65 is slidable in the vertical direction being an axial direction of the cylinder 60 between the first rod guide 70 and the second rod guide 75 inside the cylinder tube 64. The piston 65 partitions a space inside the cylinder tube 64 between the first rod guide 70 and the second rod guide 75, which is filled with oil, into a first oil chamber 60A and a second oil chamber 60B. The first oil chamber 60A is a space between the piston 65 and the first rod guide 70, whereas the second oil chamber 60B is a space between the piston 65 and the second rod guide 75.

Further, communication paths 65a configured to bring the first oil chamber 60A and the second oil chamber 60B into communication with each other are formed in the piston 65. When the shock absorber 50 is extended, specifically, when the piston 65 is moved downward, the oil is moved from the first oil chamber 60A into the second oil chamber 60B through the communication paths 65a. On the other hand, when the shock absorber 50 is contracted, specifically, when the piston 65 is moved upward, the oil is moved from the second oil chamber 60B into the first oil chamber 60A through the communication paths 65a. By the movement of the oil through the communication paths 65a as described above, a damping force is generated.

The first rod 61 extends below the piston 65, whereas the second rod 62 having a larger diameter than that of the first rod 61 extends above the piston 65. The first rod 61 extends downward from the piston 65 and passes through the first oil chamber 60A to slidably pass through the first rod guide 70 to project externally from the cylinder 60. A portion of the first rod 61, which projects externally from the cylinder 60, becomes longer as the piston 65 is moved downward, whereas a portion of the first rod 61, which is accommodated in the cylinder 60, becomes longer as the piston 65 is moved upward.

Meanwhile, the second rod 62 extends upward from the piston 65 and passes through the second oil chamber 60B to slidably pass through the second rod guide 75. When the piston 65 is positioned above a lowermost position (see FIG. 5), the second rod 62 projects from the second rod guide 75 to outside of the cylinder 60. A portion of the second rod 62, which is accommodated in the cylinder 60, becomes longer as the piston 65 is moved downward, whereas a portion of the second rod 62, which projects externally from the cylinder 60, becomes longer as the piston 65 is moved upward. The cap member 90 has a cylinder portion 93 having a cylindrical shape. The cylinder portion 93 is formed above a main body portion 91 which is configured to accommodate the second rod guide 75 therein and is mounted to the upper end portion of the cylinder tube 64, and has a through hole 93a passing in the vertical direction. The second rod 62 passes through the through hole 93a of the cylinder portion 93 to project externally from the cylinder 60 and also from the cap member 90.

The stopper 66 having an annular plate shape is provided at a position slightly down away from the piston 65. The stopper 66 comes into abutment against the rubber member 74 of the first rod guide 70 when the shock absorber 50 is most extended, specifically, when the piston 65 is positioned at the lowermost position (see FIG. 5). Further, the stopper 67 having an annular plate shape is also provided at a position slightly up away from the piston 65. The stopper 67 comes into abutment with the plate member 79 of the second rod guide 75 when the shock absorber 50 is most contracted, specifically, when the piston 65 is positioned at an uppermost position (see FIG. 6).

More specifically, an upper end portion of the first rod 61 passes through the piston 65 to be located above the piston 65 so as to be forced into a lower end portion of the second rod 62 having a larger diameter than that of the first rod 61. The stopper 66 is fitted over an outer periphery of the first rod 61 to be opposed to a lower surface of the piston 65.

Meanwhile, the stopper 67 is fitted over an outer periphery of the first rod 61 to be opposed to an upper surface of the piston 65 to come into abutment against a lower surface of the second rod 62. Further, a sub-communication path 61a configured to bring the communication paths 65a of the piston 65 and the first oil chamber 60A into communication with each other is formed in the first rod 61. A needle valve 612 configured to adjust an opening degree of the sub-communication path 61a to increase or decrease the damping force is accommodated inside the first rod 61.

The damper 51 of the shock absorber 50 further includes the pressurizing mechanism 100 configured to pressurize the oil filling a space inside the cylinder 60. The pressurizing mechanism 100 includes a cylinder 101 having a cylindrical shape and a piston 102. The cylinder 101 has the vertical direction as an axial direction. The piston 102 is slidable in the vertical direction inside the cylinder 101. The piston 102 partitions a space inside the cylinder 101 into a gas chamber 100A and an oil chamber 100B. The gas chamber 100A is filled with a high-pressure gas, whereas the oil chamber 100B is in communication with the cylinder 60 and is filled with the oil. The pressurizing mechanism 100 is mounted to the cap member 90 mounted to the upper end portion of the cylinder tube 64.

More specifically, the cap member 90 includes a pressurizing-mechanism mounting portion 92 extending radially from the main body portion 91 mounted to the upper end portion of the cylinder tube 64. The pressurizing mechanism 100 is coupled to a lower surface of the pressurizing-mechanism mounting portion 92. A communication path 92a configured to bring the cylinder 60 of the damper 51 and the cylinder 101 of the pressurizing mechanism 100 into communication with each other is formed in the pressurizing-mechanism mounting portion 92. The communication path 92a is brought into communication with the space inside the cylinder 60 through the gap 759 formed between the upper end of the cylinder tube 64 and the second rod guide 75. A pressure applied to the oil in the oil chamber 100B from the piston 102 through the high-pressure gas enclosed within the gas chamber 100A of the cylinder 101 is transferred to the oil inside the cylinder 60 of the damper 51 through the communication path 92a formed in the pressurizing-mechanism mounting portion 92.

In the shock absorber 50 of this embodiment, the second rod 62 positioned on the upper side is formed to have a larger diameter than that of the first rod 61 positioned on the lower side, as described above. In this case, the force generated by the hydraulic pressure is exerted upward at a boundary portion between the first rod 61 and the second rod 62. In this embodiment, the stopper 67 is arranged at the boundary between the first rod 61 and the second rod 62. An area of an upper pressure-receiving surface of the stopper 67 is smaller than an area of a lower pressure-receiving surface of the stopper 67. Hence, the force generated by the hydraulic pressure is exerted upward on the stopper 67. As a result, the force generated by the hydraulic pressure is exerted upward, specifically, in a direction in which the first rod 61 is accommodated into the cylinder 60 even when the first rod 61 is coupled to the stopper 67 and the like. In this manner, the force generated by the hydraulic pressure is exerted on the shock absorber 50 in a contraction direction. A member arranged at the boundary between the first rod 61 and the second rod 62 is not limited to the stopper 67, and may be the piston 65 or the stopper 66.

Further, the force generated by the hydraulic pressure is exerted upward on the stopper 67, the first rod 61 coupled thereto, and the like, as described above. Thus, when the shock absorber 50 is contracted to move the first rod 61 upward, the piston 102 of the pressurizing mechanism 100 is also moved upward, that is, in a direction in which the oil is pressurized (see FIG. 6). On the contrary, when the shock absorber 50 is extended to move the first rod 61 downward, the piston 102 of the pressurizing mechanism 100 is also moved downward (see FIG. 5).

A rod-end coupling member 80 which extends in the vertical direction is mounted to the lower end portion of the first rod 61. Specifically, the lower end portion of the first rod 61 is forced into an upper end portion of the rod-end coupling member 80. The rod mounting member 81 is mounted to a lower end portion of the rod-end coupling member 80. A through hole 81a passing in a front-and-rear direction is formed in the rod mounting member 81.

A flange portion 82 is provided on an upper end portion of the rod-end coupling member 80. A spring seat 83 is provided on the flange portion 82. A spring seat 69 is provided on a middle portion of the cylinder tube 64. The spring 52 is supported between the spring seat 69 provided on the cylinder tube 64 and the spring seat 83 provided on the rod-end coupling member 80. The spring 52 is arranged along the axis CA of the cylinder 60 to surround the cylinder 60 and the first rod 61.

An adjuster 84 configured to adjust the damping force is provided on a middle portion of the rod-end coupling member 80. The adjuster 84 radially moves an adjusting element 841 provided inside the rod-end coupling member 80 to vertically move an inner rod 611 provided inside the first rod 61. Along with the vertical movement of the inner rod 611, the needle valve 612 arranged above the inner rod 611 is also vertically moved. As a result, an opening degree of the sub-communication path 61*a* is adjusted by the needle valve 612.

The cylinder mounting member 95 is provided on the cap member 90 mounted to the upper end portion of the cylinder tube 64. A through hole 95*a* passing in the front-and-rear direction is formed in the cylinder mounting member 95. The through hole 81*a* formed in the rod mounting member 81 and the through hole 95*a* formed in the cylinder mounting member 95 are oriented in the same direction to enable rocking of the shock absorber 50.

The cylinder mounting member 95 is arranged as offset from the axis CA of the cylinder 60. In other words, the cylinder mounting member 95 is provided on a radially outer side of the cylinder 60 with respect to the axis CA of the cylinder 60. Specifically, the cylinder mounting member 95 is provided on the radially outer side of the cylinder 60 as compared to the second rod 62 so as not to interfere with the second rod 62. Further, the cylinder mounting member 95 is arranged on the radially outer side of the cylinder 60 as compared to the cylinder 60.

Further, the cylinder mounting member 95 is arranged below a position FE of the upper end of the second rod 62 when the shock absorber 50 is most contracted (see FIG. 6). Further, the cylinder mounting member 95 is arranged below a center position HE of the second rod 62 in the vertical direction when the shock absorber 50 is most contracted. Meanwhile, the cylinder mounting member 95 is arranged above the second rod guide 75 that is provided on the upper end portion of the cylinder 60. Further, the cylinder mounting member 95 is arranged above the upper end of the second rod 62 when the shock absorber 50 is most extended (see FIG. 5).

Further, the cylinder mounting member 95 is offset from the axis CA of the cylinder 60 in a direction opposite to a side to which the pressurizing mechanism 100 is provided. Further, the cylinder mounting member 95 is provided at a position away from the cylinder portion 93 of the cap member 90 in the radial direction. The cap member 90 has a support portion 94 extending radially from the cylinder portion 93. The cylinder mounting member 95 is provided on a distal end portion of the support portion 94. The cylinder mounting member 95 is provided below an upper end of the cylinder portion 93.

Still further, the axis CA of the cylinder 60 and an axis BB passing through the through hole 95*a* in the cylinder mounting member 95 are skew lines not intersecting with each other or being parallel to each other in a three-dimensional space. Specifically, the axis CA of the cylinder 60 and the axis BB passing through the through hole 95*a* of the cylinder mounting member 95 are radially away from each other, and thus do not intersect with each other. Further, the axis CA of the cylinder 60 extends in the vertical direction, whereas the axis BB passing through the through hole 95*a* of the cylinder mounting member 95 extends in the front-and-rear direction. Therefore, the axis CA and the axis BB are not parallel to each other either.

As illustrated in FIG. 2, the rod mounting member 81 of the shock absorber 50 is coupled to the bracket 421 and provided on each of the lower arms 42R and 42L of the snowmobile 1. Meanwhile, the cylinder mounting member 95 of the shock absorber 50 is coupled to each of the brackets 301 and provided on the vehicle body frame 30 of the snowmobile 1. In this case, the cylinder mounting member 95 is positioned on an inner side of the cylinder 60 in a vehicle width direction. On the contrary thereto, the cylinder mounting member 95 may be positioned on an outer side of the cylinder 60 in the vehicle width direction. The target member to which the rod mounting member 81 is coupled and the target member to which the cylinder mounting member 95 is coupled may be interchanged. Specifically, the rod mounting member 81 may be coupled to a corresponding one of the brackets 301 and positioned on an upper side, whereas the cylinder mounting member 95 may be coupled to a corresponding one of the brackets 421 and positioned on a lower side.

FIG. 2 illustrates a state in which the right ski 41R is subjected to a larger reaction force from a snow surface than a reaction force to which the left ski 41L is subjected so that the right shock absorber 50R is more contracted than the left shock absorber 50L. Therefore, the second rod 62 projects externally from the cap member 90 of the right shock absorber 50R.

In this embodiment described above, the cylinder mounting member 95 is arranged as offset from the axis CA of the cylinder 60, as illustrated in FIG. 3, FIG. 5, and FIG. 6. More specifically, the cylinder mounting member 95 is arranged on the radially outer side of the cylinder 60 as compared to the second rod 62, and also is arranged on the radially outer side of the cylinder 60 as compared to the cylinder 60. With this arrangement, the degree of freedom of the position of the cylinder mounting member 95 along the axial direction (vertical direction) of the cylinder 60 can be increased while ensuring a movable range of the second rod 62.

Further, in this embodiment, the cylinder mounting member 95 is arranged as located on an axially inner (lower) side of an outer (upper) axial end of the second rod 62 when the shock absorber 50 is most contracted, as illustrated in FIG. 6. With this arrangement, an interval between the rod mounting member 81 and the cylinder mounting member 95 can be reduced as compared to a case without the above-mentioned characteristic.

Still further, in this embodiment, the cylinder mounting member 95 is arranged on an axially outer (upper) side of the second rod guide 75, as illustrated in FIG. 5 and FIG. 6. With this arrangement, an increase in angle formed between a straight line connecting the rod mounting member 81 and the cylinder mounting member 95 and the axis CA of the cylinder 60 can be suppressed as compared to the case without the above-mentioned characteristic. Further, the cylinder mounting member 95 can be arranged closer to the second rod 62. As a result, a stress, exerted on the support portion 94 configured to support the cylinder mounting member 95 in a cantilever fashion, can be reduced.

Still further, in this embodiment, the cylinder mounting member 95 is provided on the radially outer side of the cylinder 60 with respect to the cylinder portion 93 of the cap member 90 mounted to the end portion of the cylinder tube 64, as illustrated in FIG. 5 and FIG. 6. With this arrangement, a length of the supporting portion 94 configured to support the cylinder mounting member 95 in a cantilever fashion can be reduced as compared to the case without the above-mentioned characteristic. Thus, strength against the stress exerted on the supporting portion 94 can be improved.

Still further, in this embodiment, the axis CA of the cylinder 60 and the axis BB passing through the through hole 95*a* formed in the cylinder mounting member 95 are skew lines not intersecting with each other or being parallel to each other, as illustrated in FIG. 5 and FIG. 6. With this arrangement, disturbance of the movable range of the second rod 62 by a target to be coupled such as the bracket to which the cylinder mounting member 95 is coupled and a coupling member such as a bolt used for coupling can be suppressed as compared to the case without the above-mentioned characteristic.

Still further, in this embodiment, the second rod guide 75 is provided on the end portion of the cylinder tube 64, and the second rod 62 projects from the second rod guide 75 to outside of the cylinder tube 64, as illustrated in FIG. 5 and FIG. 6. With this arrangement, a length of the cylinder tube 64 can be reduced as compared to the case without the above-mentioned characteristic, which can eventually reduce a total length of the shock absorber 50.

Still further, in this embodiment, the pressurizing mechanism 100 is arranged outside of the cylinder tube 64, as illustrated in FIG. 5 and FIG. 6. With this arrangement, the length of the cylinder tube 64 can be reduced as compared to the case without the above-mentioned characteristic, which can eventually reduce the total length of the shock absorber 50.

Still further, in this embodiment, the cylinder mounting member 95 is provided on the side opposite to the side to which the pressurizing member 100 is provided, with respect to the axis CA of the cylinder 60, as illustrated in FIG. 5 and FIG. 6. With this arrangement, inhibition of the coupling of the cylinder mounting member 95 by the pressurizing mechanism 100 can be suppressed to improve ease of layout of the shock absorber 50 as compared to the case without the above-mentioned characteristic.

Still further, in this embodiment, the spring 52 is arranged as inclined with respect to the straight line connecting the rod mounting member 81 and the cylinder mounting member 95 along the axis CA of the cylinder 60, as illustrated in FIG. 5 and FIG. 6. With this arrangement, a spring force of the spring 52 can be more directly exhibited for the extension and contraction of the damper 51.

Figure 7:
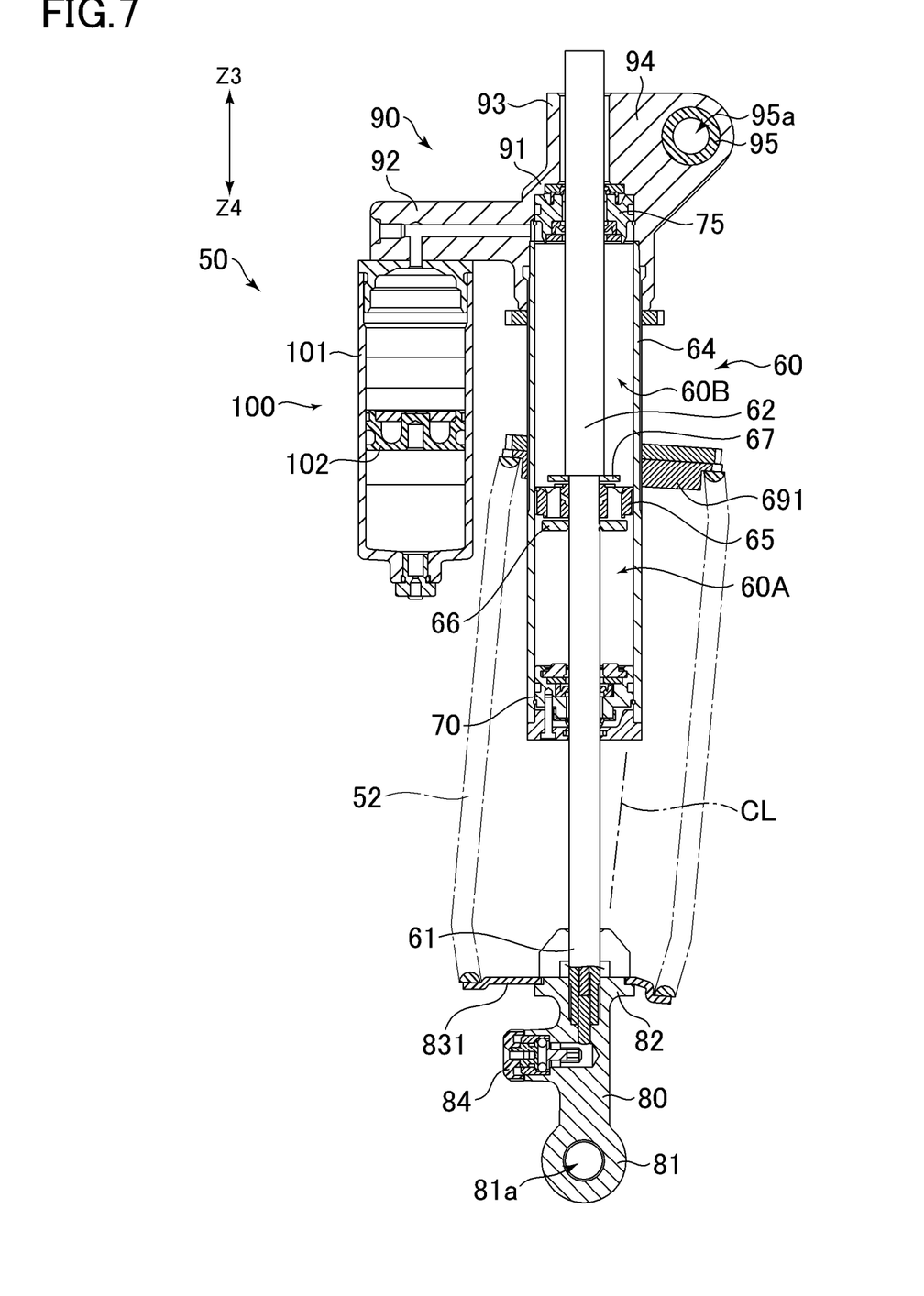
FIG. 7 is a sectional view of a shock absorber according to a modification example.

The arrangement of the spring 52 is not limited to the above-mentioned case. As in a modification example illustrated in FIG. 7, the spring 52 may be arranged as inclined with respect to the axis CA of the cylinder 60. In this modification example, an upper spring seat 691 provided on the cylinder tube 64 is formed to extend in an offset direction of the cylinder mounting member 95, whereas a lower spring seat 831 provided on the rod-end coupling member 80 is formed to extend in a direction opposite to the offset direction. The spring 52 is arranged along a straight line CL connecting the rod mounting member 81 and the cylinder mounting member 95 when the piston 65 is located in the middle of the cylinder 60, for example, when the shock absorber 50 is compressed by about ⅓ from a most extended state. With this arrangement, a bending force applied to the first rod 61 as a result of the compression of the spring 52 can be reduced.

Figure 8:
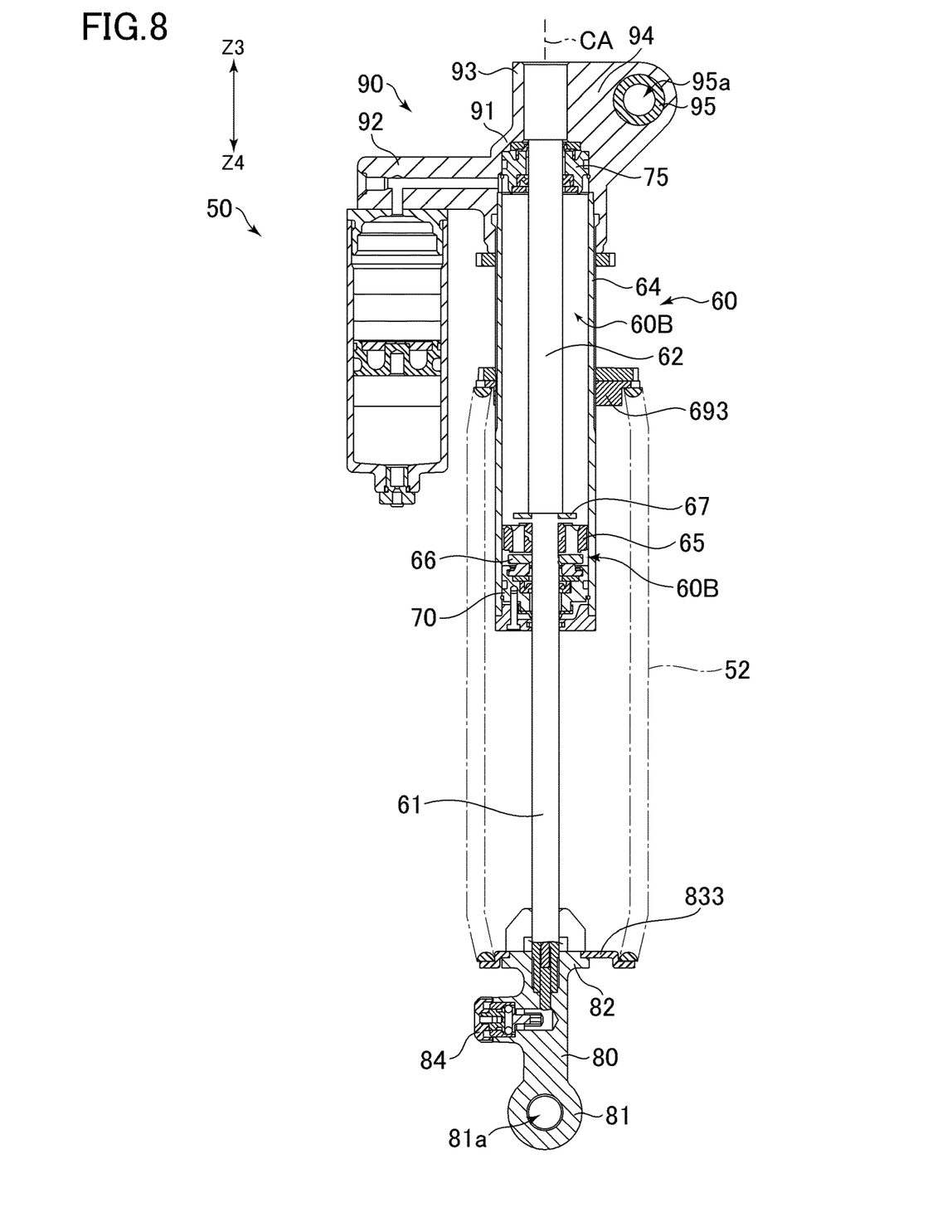
FIG. 8 is a sectional view of a shock absorber according to another modification example.

Further, as in a modification example illustrated in FIG. 8, the spring 52 may be arranged as offset from the axis CA of the cylinder 60. In this modification example, the spring 52 is offset to the same direction in which the cylinder mounting member 95 is offset with respect to the axis CA of the cylinder 60, while being arranged along the axis CA of the cylinder 60. A spring seat 693 provided on the cylinder tube 64 and a spring seat 833 provided on the rod-end coupling member 80 are formed to extend in the offset direction of the cylinder mounting member 95. With this arrangement, the bending force applied to the first rod 61 as a result of the compression of the spring 52 can be reduced as in the embodiment described above.

Still further, in this embodiment, the rod mounting members 81 of the shock absorbers 50 are mounted to the lower arms 42R and 42L of the snowmobile 1, respectively, whereas the cylinder mounting members 95 of the shock absorbers 50 are mounted to the vehicle body frame 30 of the snowmobile 1, as illustrated in FIG. 2. With this configuration, the second rods 62 project upward. Thus, it is not necessary to take a clearance between each of the second rods 62 and the ground surface into consideration.

Still further, in this embodiment, each of the cylinder mounting members 95 is positioned on the inner side of the cylinder 60 in the vehicle width direction, as illustrated in FIG. 2. Specifically, the cylinder mounting members 95 are offset in a direction toward the vehicle body. With this arrangement, interference between the vehicle body frame 30 to which the cylinder mounting members 95 are mounted and the cylinders 60 can be suppressed to improve the ease of layout of the shock absorber 50.

The shock absorber according to the present application is not limited to the embodiment described above. For example, as disclosed in Japanese Patent Application Laid-open No. 2010-96347, the length of the cylinder tube may be set long and the second rod guide may be provided in the middle of the cylinder tube so that the second rod (sub-rod) is movable only on the inner side of the cylinder tube. Further, as disclosed in Japanese Patent Application Laid-open No. 2010-96347, the pressurizing mechanism including the spring may be provided on the inner side of the cylinder tube. Further, the shock absorber according to the embodiment may be applied to the shock absorber 19 (see FIG. 1) arranged inside of the track belt 16.

A modification example in which the shock absorber according to the embodiment is applied to a vehicle for running on an irregular ground is now described. In the following description, configuration elements common to those of the above-mentioned embodiment are denoted by the same reference symbols, and detailed description thereof is herein omitted.

Figure 9:
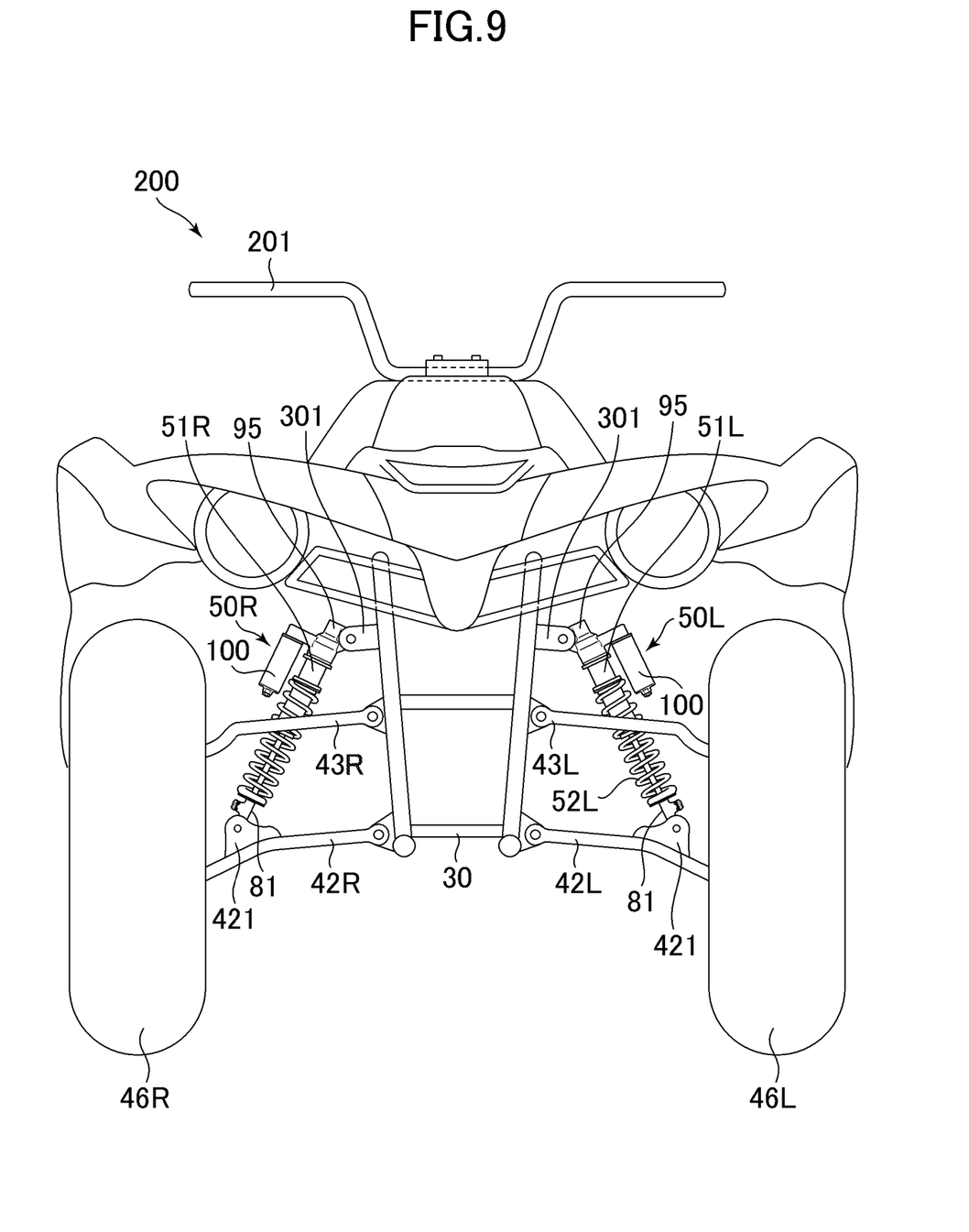
FIG. 9 is a front view of a vehicle according to the embodiment.
Figure 10:
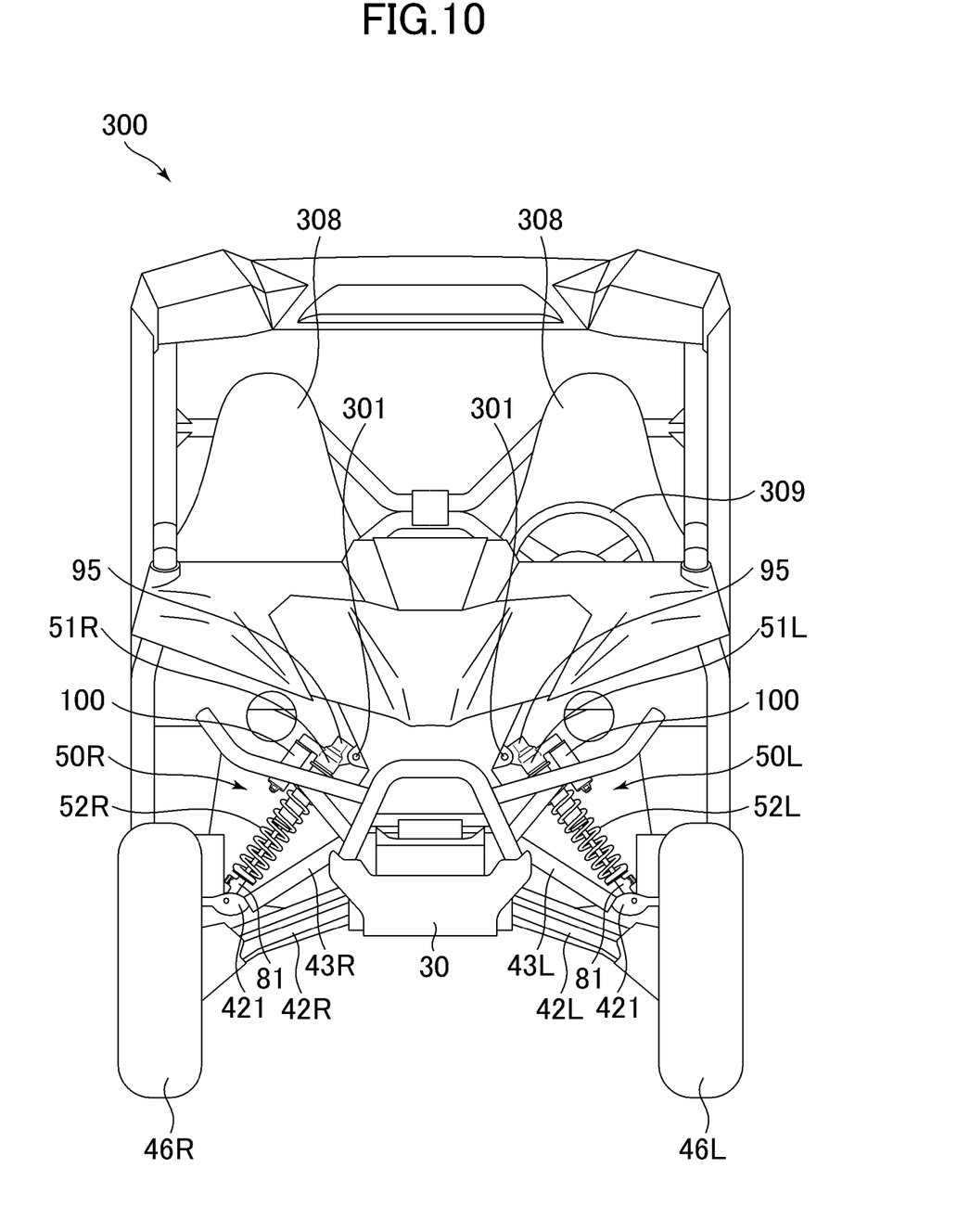
FIG. 10 is a front view of another vehicle according to the embodiment.

FIG. 9 is a front view of a vehicle 200, and FIG. 10 is a front view of a vehicle 300, to each of which the above-mentioned shock absorbers 50R and 50L are applied. The vehicle 200 illustrated in FIG. 9 is a saddle type four-wheeled vehicle called an "all-terrain vehicle (ATV)", which includes a steering bar 201. The vehicle 300 illustrated in FIG. 10 is a four-wheeled vehicle called a "recreational off-highway vehicle (ROV)", which includes a plurality of seats 308 arranged in the vehicle width direction and a steering wheel 309.

As illustrated in FIG. 9 and FIG. 10, each of the vehicles 200 and 300 has front wheels 46R and 46L arranged on both the right and left of the front part of the vehicle body frame 30 as grounded portions. The right front wheel 46R is supported by the lower arm 42R and the upper arm 43R, whereas the left front wheel 46L is supported by the lower arm 42L and the upper arm 43L. The base portions of the arms 42R, 43R, 42L, and 43L are coupled to the vehicle body frame 30 to be rotatable. As a result, the front wheels 46R and 46L are vertically movable relative to the vehicle body frame 30.

Each of the vehicles 200 and 300 includes the shock absorbers 50R and 50L. The shock absorber 50R includes the damper 51R and the spring 52R, whereas the shock absorber 50L includes the damper 51L and the spring 52L. The rod mounting members 81 provided on lower portions of the shock absorbers 50R and 50L are coupled to the brackets 421 provided on the lower arms 42R and 42L in the vehicle 200 and are coupled to the brackets 421 provided on the upper arms 43R and 43L in the vehicle 300. Meanwhile, the cylinder mounting members 95 provided on the upper portions of the shock absorbers 50 are coupled to the brackets 301 provided on the vehicle body frame 30. The shock absorbers 50R and 50L are used not only to suspend the front wheels 46R and 46L but may also be used to suspend rear wheels (not shown).

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A shock absorber, comprising:
   a cylinder assembly having an axis in axial direction;
   wherein the cylinder assembly includes a cylinder tube;
   a piston, wherein the piston is configured to partition an internal space of the cylinder assembly into two oil chambers and is capable of sliding in the axial direction of the cylinder assembly, the piston further having formed therethrough a communication path configured to bring the two oil chambers into communication with each other;
   a first rod, which extends in a first direction of the axial direction of the cylinder assembly with respect to the piston;
   a first rod guide, which is provided on the cylinder assembly, and through which the first rod passes;
   a second rod, which has a diameter larger than a diameter of the first rod, and extends in a second direction of the axial direction of the cylinder assembly, which is opposite to the first direction, with respect to the piston;
   a second rod guide, which is provided on the cylinder assembly, and through which the second rod passes;
   a pressurizing mechanism, which is configured to pressurize oil filling the internal space of the cylinder assembly;
   a rod mounting member, which is provided on the first rod outside of the cylinder assembly;
   a cylinder mounting member, which is provided on the cylinder assembly outside of the cylinder assembly;
   wherein the cylinder mounting member is arranged on an outer side of the cylinder assembly in a radial direction of the cylinder assembly; and
   a spring, which is configured to be expanded and contracted in accordance with relative movement between the rod mounting member and the cylinder mounting member,
   wherein the cylinder mounting member is offset from the axis of the cylinder assembly,
   wherein the pressurizing member is arranged outside of a cylinder tube included in the cylinder assembly, and wherein the cylinder mounting member is provided on a side opposite to a side to which the pressurizing member is provided with respect to the axis of the cylinder assembly; and
   wherein the second rod guide is provided on an end portion of a cylinder tube included in the cylinder assembly, and wherein the second rod is configured to project from the second rod guide to outside and past the cylinder tube.

2. The shock absorber according to claim 1, wherein the cylinder mounting member is arranged on an inner side of an outer axial end of the second rod in the axial direction of the cylinder assembly when the shock absorber is most contracted.

3. The shock absorber according to claim 1, wherein the cylinder mounting member is arranged on an outer side of the second rod guide in the axial direction of the cylinder assembly.

4. The shock absorber according to claim 1, wherein the cylinder mounting member is arranged on an outer side of the second rod in a radial direction of the cylinder assembly.

5. The shock absorber according to claim 1, further comprising a cap member mounted on an end portion of a cylinder tube included in the cylinder assembly,
   wherein the cylinder mounting member is mounted on the cap member.

6. The shock absorber according to claim 5, wherein the cap member comprises a cylinder portion configured to allow passage of the second rod therethrough, and
   wherein the cylinder mounting member is provided on an outer side of the cylinder portion in a radial direction of the cylinder assembly.

7. The shock absorber according to claim 1, wherein the pressurizing mechanism is arranged outside of a cylinder tube included in the cylinder assembly.

8. The shock absorber according to claim 7, wherein the cylinder mounting member is provided on a side opposite to a side to which the pressurizing mechanism is provided with respect to the axis of the cylinder assembly.

9. The shock absorber according to claim 1, wherein the axis of the cylinder assembly and an axis passing through a through hole formed in the cylinder mounting member are skew lines not intersecting with each other and being parallel to each other.

10. The shock absorber according to claim 1, wherein the spring is arranged as inclined with respect to a straight line connecting the rod mounting member and the cylinder mounting member and is arranged along the axis of the cylinder assembly.

11. The shock absorber according to claim 1, wherein the spring is arranged as inclined with respect to the axis of the cylinder assembly.

12. The shock absorber according to claim 1, wherein the spring is arranged as offset from the axis of the cylinder assembly.

13. The shock absorber according to claim 1, wherein the second rod is configured to be located above the rod mounting member, when the shock absorber is mounted in a vehicle.

14. The shock absorber according to claim 1, wherein the second rod is configured to extend substantially past the cylinder tube and also past the cylinder mounting member.

15. A vehicle, comprising:
    a right shock absorber; and
    a left shock absorber,
    each of the right shock absorber and the left shock absorber comprising:
    a cylinder assembly having an axis in axial direction;
    a piston, wherein the piston is configured to partition an internal space of the cylinder assembly into two oil chambers and is capable of sliding in the axial direction of the cylinder assembly, the piston further having formed therethrough a communication path configured to bring the two oil chambers into communication with each other;

a first rod, which extends in a first direction of the axial direction of the cylinder assembly with respect to the piston;
a first rod guide, which is provided on the cylinder assembly, and through which the first rod passes;
a second rod, which has a diameter larger than a diameter of the first rod, and extends in a second direction of the axial direction of the cylinder assembly, which is opposite to the first direction, with respect to the piston;
a second rod guide, which is provided on the cylinder assembly, and through which the second rod passes;
a pressurizing mechanism, which is configured to pressurize oil filling the internal space of the cylinder assembly;
a rod mounting member, which is provided on the first rod outside of the cylinder assembly;
a cylinder mounting member, which is provided on the cylinder assembly outside of the cylinder assembly;
wherein the cylinder mounting member is arranged on an outer side of the cylinder assembly in a radial direction of the cylinder assembly; and
a spring, which is configured to be expanded and contracted in accordance with relative movement between the rod mounting member and the cylinder mounting member,
wherein the cylinder mounting member is arranged as offset from the axis of the cylinder assembly,
wherein the pressurizing member is arranged outside of a cylinder tube included in the cylinder assembly, and wherein the cylinder mounting member is provided on a side opposite to a side to which the pressurizing member is provided with respect to the axis of the cylinder assembly; and
wherein the second rod guide is provided on an end portion of a cylinder tube included in the cylinder assembly, and wherein the second rod is configured to project from the second rod guide to outside and past the cylinder tube.

16. The vehicle according to claim 15, further comprising:
a right grounded portion;
a left grounded portion;
a right arm configured to support the right grounded portion; and
a left arm configured to support the left grounded portion,
wherein the right arm and the left arm are vertically movable relative to a vehicle body, and
wherein the rod mounting member of the right shock absorber is mounted to the right arm and the rod mounting member of the left shock absorber is mounted to the left arm, whereas the cylinder mounting members of the right and left shock absorbers are mounted to the vehicle body, respectively.

17. The vehicle according to claim 16, wherein each of the cylinder mounting members of the right shock absorber and the left shock absorber are positioned on an inner side of the cylinder assemblies of their respective right shock absorber and left shock absorber in a vehicle width direction.

18. A snowmobile, comprising:
a right ski and a left ski;
a right arm configured to support the right ski and a left arm configured to support the left ski, the right arm and the left arm being vertically movable relative to a vehicle body;
a track belt being vertically movable relative to the vehicle body; and
a shock absorber arranged between the vehicle body and any one of the right arm, the left arm, and the track belt,
the shock absorber comprising:
a cylinder assembly;
a piston, wherein the piston is configured to partition an internal space of the cylinder assembly into two oil chambers and is capable of sliding in an axial direction of the cylinder assembly, the piston further having formed therethrough a communication path configured to bring the two oil chambers into communication with each other;
a first rod, which extends in a first direction of the axial direction with respect to the piston;
a first rod guide, which is provided on the cylinder assembly, and through which the first rod passes;
a second rod, which has a diameter larger than a diameter of the first rod, and extends in a second direction of the axial direction, which is opposite to the first direction, with respect to the piston;
a second rod guide, which is provided on the cylinder assembly, and through which the second rod passes;
a pressurizing mechanism, which is configured to pressurize oil filling the internal space of the cylinder assembly;
a rod mounting member, which is provided on the first rod outside of the cylinder assembly;
a cylinder mounting member, which is provided on the cylinder assembly outside of the cylinder assembly;
wherein the cylinder mounting member is arranged on an outer side of the cylinder assembly in a radial direction of the cylinder assembly; and
a spring, which expands and contracts in accordance with relative movement between the rod mounting member and the cylinder mounting member,
wherein the cylinder mounting member is arranged as offset from the axis of the cylinder assembly,
wherein the pressurizing member is arranged outside of a cylinder tube included in the cylinder assembly, and wherein the cylinder mounting member is provided on a side opposite to a side to which the pressurizing member is provided with respect to the axis of the cylinder assembly; and
wherein the second rod guide is provided on an end portion of a cylinder tube included in the cylinder assembly, and wherein the second rod is configured to project from the second rod guide to outside and past the cylinder tube.

* * * * *